United States Patent [19]

McFarland

[11] Patent Number: 5,429,003
[45] Date of Patent: Jul. 4, 1995

[54] MOVING SENSOR LINEAR TRUE MASS FLOWMETER

[76] Inventor: Robert A. McFarland, 3740 Transport St., Ventura, Calif. 93006

[21] Appl. No.: 231,799

[22] Filed: Apr. 25, 1994

[51] Int. Cl.⁶ .............................................. G01F 1/00
[52] U.S. Cl. .................. 73/861.42; 73/861.18; 73/170.15
[58] Field of Search ........... 73/861.18, 861.42, 861.52, 73/170.14, 170.15, 861.65, 861.71, 861.74, 861.75, 861.83

[56] References Cited

U.S. PATENT DOCUMENTS

| | | | |
|---|---|---|---|
| 2,078,837 | 4/1937 | Carter | 73/861.42 |
| 3,360,989 | 1/1968 | Herrington | 73/861.85 |
| 3,382,715 | 5/1968 | Larkam et al. | 73/861.65 |
| 3,426,593 | 2/1969 | Jacobs | 73/861.18 |
| 3,465,586 | 9/1969 | Johnson | 73/861.71 |
| 3,608,374 | 9/1971 | Miller | 73/861.71 |
| 3,638,488 | 2/1972 | Meijer | 73/861.18 |
| 3,762,876 | 10/1973 | Koehler | 73/170.15 |
| 5,172,592 | 12/1992 | Fisher | 73/861.42 |

Primary Examiner—Richard E. Chilcot, Jr.
Assistant Examiner—Harshad Patel
Attorney, Agent, or Firm—Jack C. Munro

[57] ABSTRACT

A linear true mass flowmeter which utilizes at least one movable sensor mounted within the path of the flow of the fluid with this sensor mounted on an axis that is perpendicular to the direction of the flow of the path of the fluid. The sensor is connected to a transducer whose output is displayed by a rate of flow indicator to determine the mass flow rate of the fluid.

1 Claim, 3 Drawing Sheets

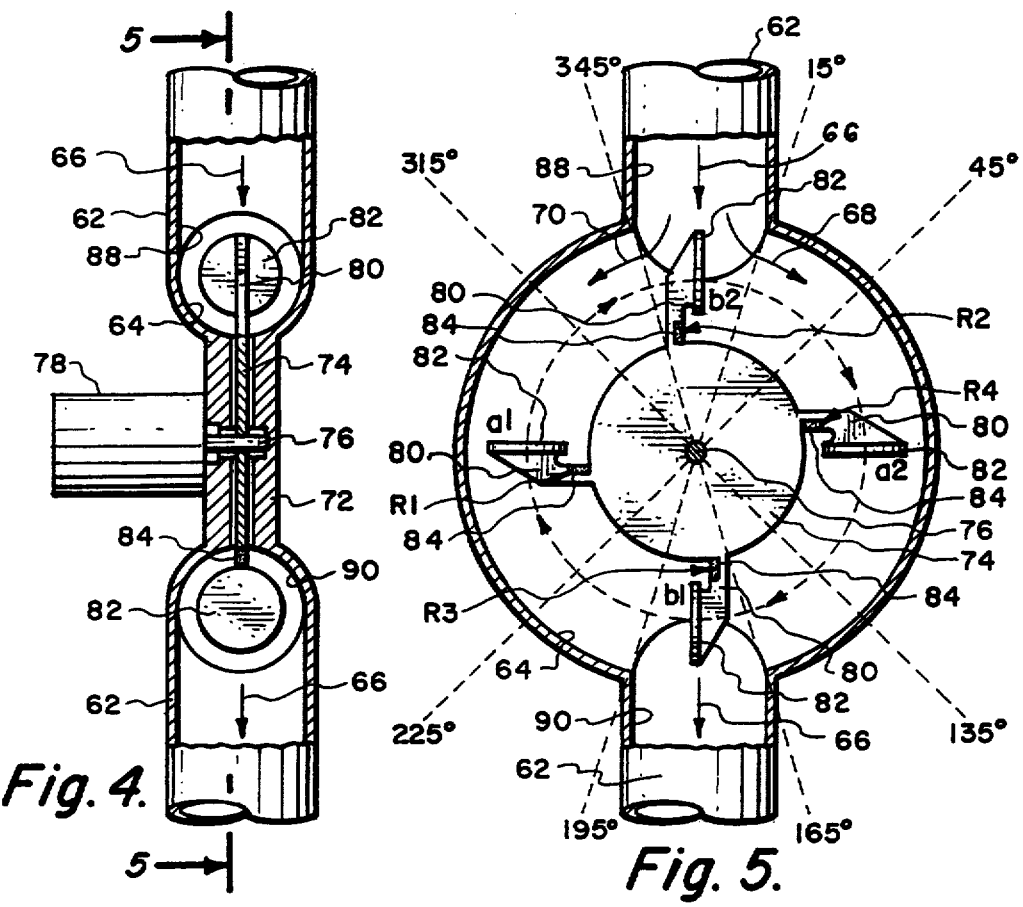
Fig. 4.
Fig. 5.
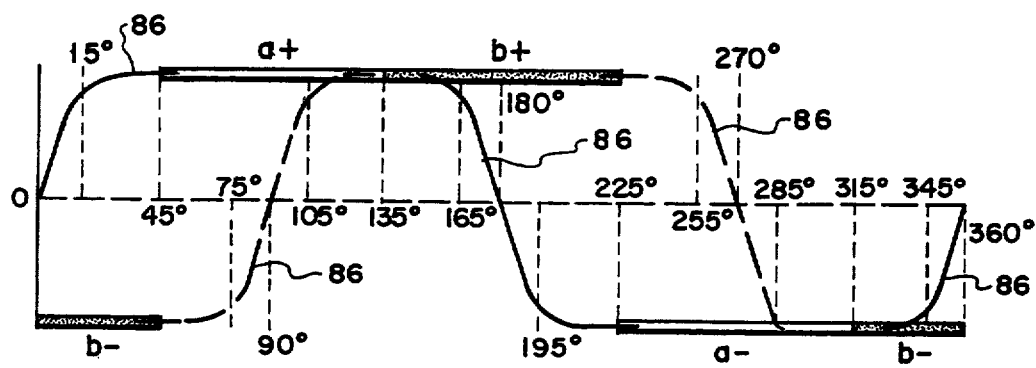
Fig. 6.
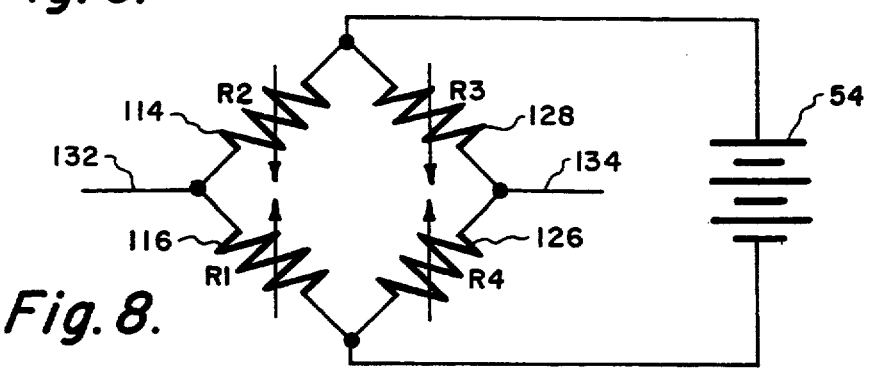
Fig. 8.

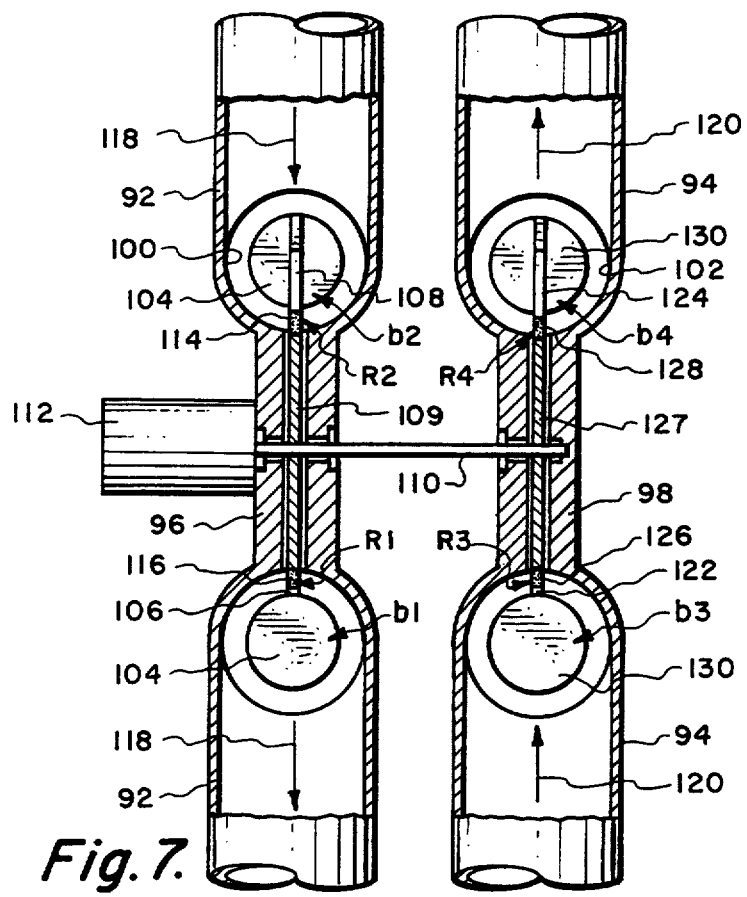
Fig. 7.
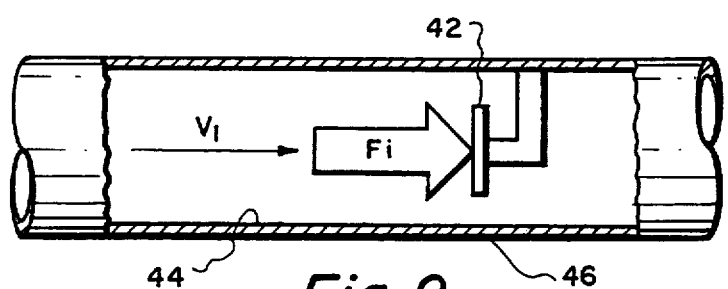
Fig. 9.
PRIOR ART
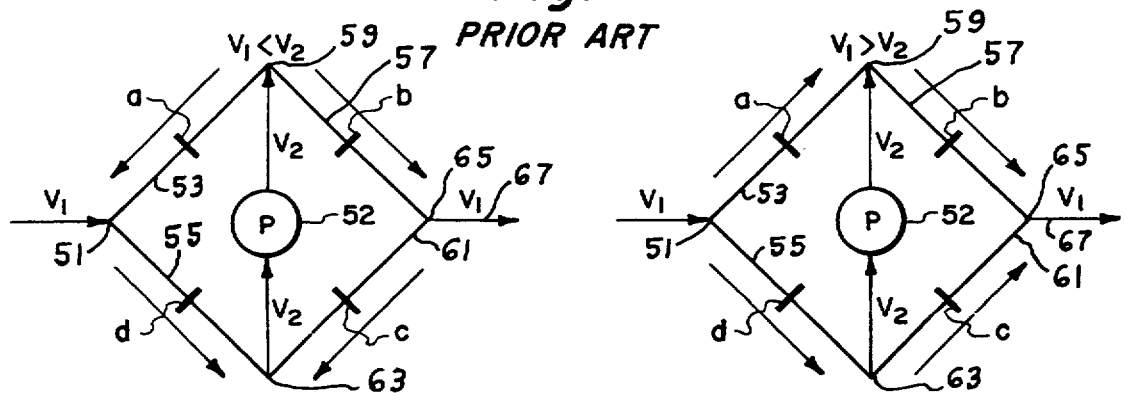
Fig. 10.
PRIOR ART
Fig. 11.
PRIOR ART

MOVING SENSOR LINEAR TRUE MASS FLOWMETER

BACKGROUND OF THE INVENTION

1) Field of the Invention

The field of this invention relates to flowmeters and more particularly to a linear true mass flowmeter to determine directly the mass flow rate of a fluid within a conduit.

2) Description of the Prior Art

A mass flow rate meter is an instrument that measures the mass of a fluid flowing through a conduit, which includes pipes and ducts, per unit time. There have been many attempts to develop practical industrial mass flowmeters. A common type of flowmeter is the orifice sensor type. A plurality of sensors, such as four in number, are located within the path of the flowing fluid. By measuring the flow through each of the orifices, the mass flow rate can be calculated utilizing a hydraulic Wheatstone bridge.

In order to obtain the linear true mass flow rate of the fluid, a differential flow across the sensors must be obtained. In order to achieve this, a recirculating pump is utilized that will extract fluid from one of the sensors and supply that same volume of fluid to another of the sensors. This is what occurs when four in number of sensors are utilized, that fluid will be extracted from two of the sensors and supplied to the remaining two sensors. In order to achieve a true mass flow measurement, an arrangement of these sensors is required that adds and subtracts a recirculating flow to the main flow so that the difference between the signals from each sensor will result in a linear true mass flow measurement.

Although the use of orifice plates in mass flowmeters has long been known, other types of differential pressure flow sensors could be utilized such as a venturi, flow nozzle, elbow meter, pitot tube, target sensor and laminar flow element. The present invention is discussed in particular in relation to a target sensor. However, it is considered to be within the scope of this invention that any other type of differential pressure sensor could be utilized.

As mentioned previously, the mass flowmeter of the prior art utilizes four sensors in conjunction with a hydraulic Wheatstone bridge. From a manufacturing standpoint, the hydraulic Wheatstone bridge (HWB) flowmeter is difficult to build and therefore expensive. To achieve high accuracy, the four orifices of this type of flowmeter must be matched to extremely high accuracy. Typically HWB meters are accurate to one-fourth to one-half of a percent with a rangeability of 100:1 to 200:1. This high accuracy requires, among other things, that the flow through each of the orifice plates be extremely closely matched over a wide flow range. This matching is primarily determined by the discharge coefficient and the area of each orifice. Typically each orifice must be precision ground and then individually tested so that a matched set of orifices can be obtained.

Another limitation of the HWB meter is that it is only suitable for clean liquids without gas bubbles in the flow stream. This is because debris and bubbles in the liquid will build up in front of the orifice plates and change their discharge coefficients. Also, because the recirculating pumps used have close tolerances, these pumps cannot pump debris without causing damage to the pump which affects accuracy or in the case of a severe damage, renders the pump (and therefore the meter) inoperable.

Another limitation of the HWB meter for large flow applications is that all the main flow must pass through the meter. This requires that the recirculating pump be sized to pump more than the highest main flow rate. In other words, it is not possible to make an insertion probe type HWB meter that measures the mass flow in a portion of the main flow stream with the majority of the main flow going around the sensor. Insertion probe flowmeters are useful for large flow measuring applications such as large diameter pipes.

Another limitation of the HWB meter is that it is not suitable for low-cost applications. The differential pressure produced across a HWB meter is typically low. High accuracy transducers for low differential pressures are expensive.

SUMMARY OF THE INVENTION

A linear true mass flowmeter that mounts one, two or four sensors in a radially displaced manner on a shaft with this shaft being pivotally mounted across and through a conduit within which the flowmeter is to be located. A motor is connected to the shaft and is designed to spin (or otherwise move) the sensors about an axis perpendicular to the direction of the main flow of the fluid. Instead of utilizing a pump to extract a portion of the flow from one sensor and supply it to another sensor, these sensors are caused to move, with rotating (spinning) being preferred, at a constant velocity. This means that in a single revolution of the shaft, a sensor will move with the direction of the main flow of the fluid and also move against the direction of the main flow of the fluid. In essence, by the spinning of the sensors in a single revolution, there is a flow increase and a flow decrease past the sensor. The velocity increase is equal to the velocity decrease. Therefore, the requirement to obtain a linear true mass flowmeter for a fluid within a conduit is achieved by arranging the sensors so an additional flow equivalent to a recirculating flow volume is added and subtracted to the main flow so that the difference between the signals from each sensor will result in a linear true mass flow measurement.

One of the objectives of the present invention is to use a target type of flow sensor in conjunction with a linear true mass flowmeter.

Another objective of the present invention is to use the target type of sensor, or differential pressure sensors other than the conventional orifice plate flow sensor, within a conventional hydraulic Wheatstone bridge flowmeter.

Another objective of the present invention is to use a spinning moving sensor arrangement within the flow path of a fluid which eliminates the need for pumped recirculating fluid from one sensor to another.

Another objective of the present invention is to utilize a moving sensor type of mass flowmeter as an insertion probe within a fluid flow path.

Another objective of the present invention is to construct a flowmeter which is of significantly lower cost than similar prior art flowmeters.

Another objective of the present invention is to construct a flowmeter which has a greater degree of accuracy than prior art similar types of flowmeters.

Another objective of the present invention is to construct a moving sensor true mass flowmeter which has an instantaneous output.

Another objective of the present invention is to use a moving sensor mass flowmeter to function as a differential mass flowmeter.

BRIEF DESCRIPTION OF THE DRAWINGS

FIG. 4 is a diagrammatic, cross-sectional view of a third embodiment of flowmeter of the present invention;

FIG. 5 is a cross-sectional view taken along line 5—5 of FIG. 4;

FIG. 6 is a waveform depiction for the difference in four signals between the sensors utilized in conjunction with the third embodiment of flowmeter of this invention;

FIG. 7 is a cross-sectional view, similar to FIG. 4, but of a fourth embodiment of flowmeter of the present invention;

FIG. 8 is a diagram for the strain gauge Wheatstone bridge utilized in conjunction with the fourth embodiment of this invention of FIG. 7;

FIG. 9 is a basic diagram (prior art) of a target sensor mounted in a fluid conduit;

FIG. 10 is a diagram for a prior art arrangement for what is normally referred to as a Type 2 meter operation; and FIG. 11 is a diagram for a prior art arrangement for what is normally referred to as a Type 1 meter operation.

DETAILED DESCRIPTION OF THE PREFERRED EMBODIMENTS

Figure 1:
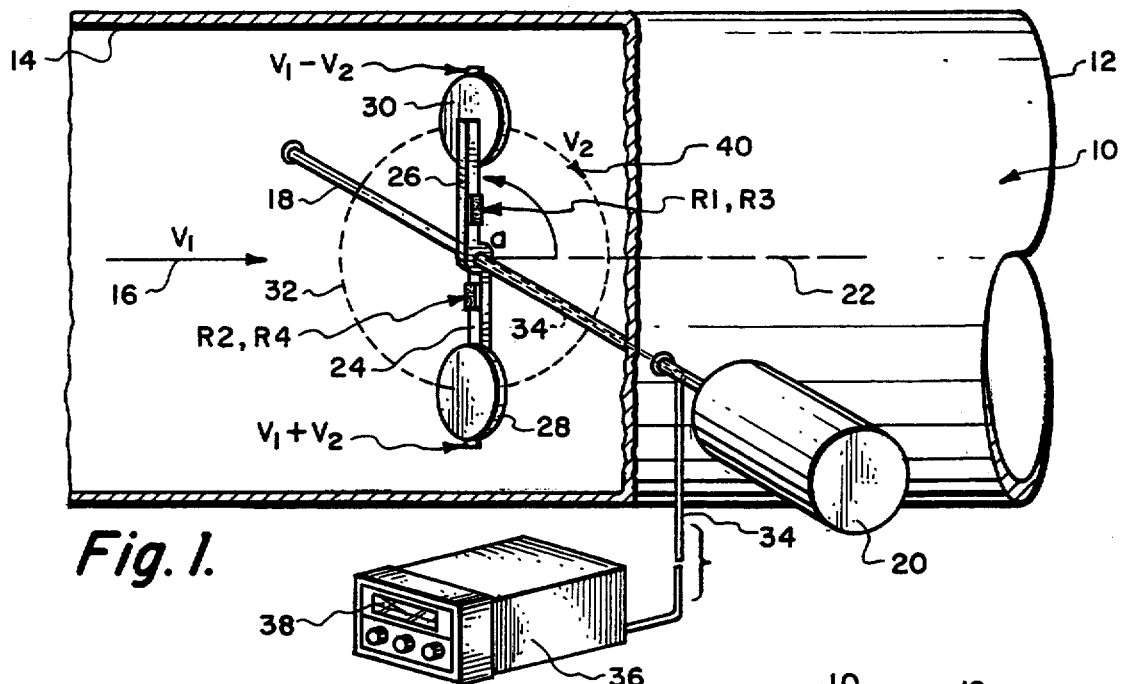
FIG. 1 is a generalized drawing, partly cut away, of the first embodiment of a moving sensor type of flowmeter of the present invention.

Reference is to be had in particularly to FIG. 1 where there is depicted a conduit 10 which has a conduit wall 12 and a fluid flow passage 14. The main flow of fluid with velocity $V_1$ is in the direction of arrow 16. Normally the fluid will comprise a liquid but it is considered to be within the scope of this invention that gaseous fluids could also be used.

Mounted through the conduit wall 12 and passing through the longitudinal center axis of the flow passage 14 is a shaft 18. The shaft 18 is rotatable relative to the conduit wall 12. Rotation of the shaft 18 is accomplished by means of an electric motor 20. Fixedly mounted on the shaft 20 in alignment with the longitudinal center axis 22 of the flow passage 14 are radially extending arms 24 and 26. The arms 24 and 26 extend opposite to each other so arms 24 and 26 are 180° apart. The arms 24 and 26 are each of the same length.

Fixedly mounted to the outer end of the arm 26 is a disk (or target) 30. The disks 28 and 30 are located so that the flat surface of each of the disks 28 and 30 is essentially perpendicular to the direction of the main fluid flow represented by arrow 16. Rotation of the shaft 18 will cause the center points of the disks 28 and 30 to be moved through a circle 32 with the plane of this circle being aligned with the direction of the main fluid flow represented by arrow 16. The disks 28 and 30 constitute target sensors. The arm 26 is shown to be angle α from the longitudinal center axis 22 with arm 26 located at the 90° position. In the position shown in FIG. 1 of the drawings, the angle α for disk 28 is 270°.

Mounted on the arm 26 are two sensors R1 and R3. Also mounted on the arm 24 are two sensors R2 and R4. Typical construction of such sensors would be strain gauges. These sensors R1 to R4 are electrically connected through conductor 34 to a rate of flow indicator 36. The rate of flow indicator 36 can take any of numerous forms but generally will include a visual display 38 which will display the rate of flow in digital form that is perceived by the flowmeter of this invention. Within this rate of flow indicator 36 is a circuit which includes the Wheatstone bridge shown in FIG. 3. The Wheatstone bridge connects the output of the strain gauges R1, R2, R3 and R4 as shown. During each revolution of the shaft 18, there will be produced a negative sinusoidal output signal in line 48 and a positive sinusoidal output signal in line 50. The bridge is supplied an input represented by battery 52.

Figure 3:
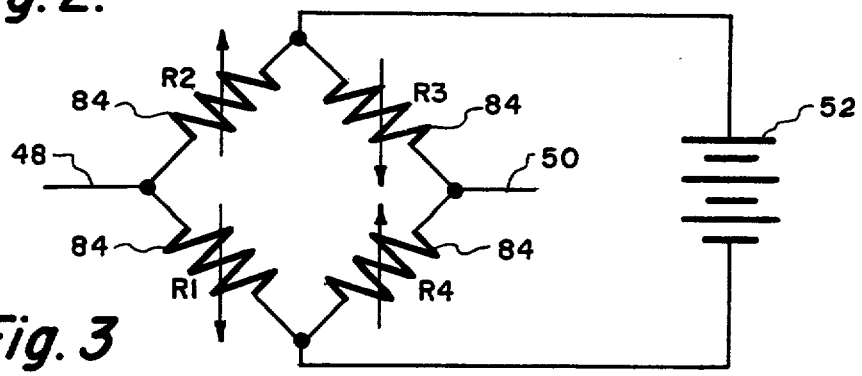
FIG. 3 is a diagram for the strain gauge Wheatstone bridge to be used in conjunction with the sensors shown in FIG. 1.

The sensors in the form of the disks 28 and 30 are spinning with a circumferential velocity $V_2$ in the direction of arrow 40. As the disks 28 and 30 spin within the fluid, referring specifically to the position shown in FIG. 1, the disk 28 is being moved directly against the velocity $V_1$ with disk 30 being moved along with the velocity $V_1$ of the fluid. This means that target 28 encounters a flow velocity $V_1+V_2$ with target 30 encountering a flow velocity $V_1-V_2$. This will be the case where the velocity of flow $V_1$ is greater than $V_2$. If $V_2$ happens to be greater than $V_1$, the only difference would be that the flow velocity past disk 30 would be $V_2-V_1$. The relative force on the disks 28 and 30 is sensed by their respective strain gauges R2/R4 and R1/R3 with the forces that are applied to the disks 28 and 30 being measured by the strain gauges. Note that two strain gauges have been attached to arm 24 and two strain gauges attached to arm 26. The reason for this is that within the rate of flow indicator 36, the output of the strain gauges R1, R2, R3, and R4 are connected as a Wheatstone bridge as is shown in FIG. 3. An increase in force on the disks 28 and 30 will increase the resistance of its respective strain gauges. The increase in resistance in FIG. 3 is depicted by the upwardly directed arrows for strain gauges R2 and R4. A decrease in force on the targets 28 and 30 will decrease the resistance of the strain gauges which is indicated by the downwardly directed arrows in strain gauges R1 and R3. Power is supplied to the bridge by a battery 52. The circuit in the rate of flow detector 36 is connected across lines 48 and 50.

Notice that the flow velocity past the disks 28 and 30 is a combination of the circumferential velocity ($V_2$) and the main fluid velocity ($V_1$). The force on the targets 28 and 30 tangent to the circumference of rotation varies sinusoidally as the targets rotate in the flow stream of the fluid. In a single revolution of the targets 28 and 30, each target 28 and 30 will be subjected to a maximum flow velocity at $V_1+V_2$ at $\alpha=270°$ and then, when target 28 moves to the edge on position to the main flow velocity $V_1$, the flow velocity past sensor 28 will equal $V_2$ at $\alpha=180°$. Then as the target 28 moves to the position shown by target 30 in FIG. 1, the target 28 will be subjected to a minimum flow velocity composed of $V_1-V_2$ at $\alpha=90°$. As target 28 moves another 90°, target 28 will again be subjected to a flow velocity equal to $V_2$ at $\alpha=0°$ and then when target 28 moves to the position that it is occupying in FIG. 1, it is now experiencing again the maximum velocity at $\alpha=270°$.

It is to be noted that it is only necessary that the targets 28 and 30 move. It is generally simpler to have the targets move at a constant velocity and rotate. However, the targets 28 and 30 could oscillate back and forth from the position shown in FIG. 1 with it only being necessary to know what is the velocity of that oscillatory movement so such can be programmed into the rate of flow indicator 36.

For the arrangement shown in FIG. 1, the velocity tangent to the circumference of the targets 28 and 30 can be expressed as $V_2 - V_1 \sin \alpha$ where $\alpha$ equals the rotational angle of the sensor. Therefore, the force tangent to the circumference of the spinning targets 28 and 30 varies sinusoidally with the maximum being at $\alpha=270°$ and with the minimum occurring at $\alpha=90°$, and the average between the peaks when the targets 28 and 30 are on edge to the main flow ($\alpha=0°$ and $180°$). Since the two targets 28 and 30 are 180° apart on the circumference of rotation, the flow variations are always equal and opposite to each other. Therefore, for the hydraulic Wheatstone bridge true mass flowmeter, the difference in force between target 28 and target 30 will be directly proportional to mass flow. The main difference will be that the output signal for the hydraulic Wheatstone bridge meter will be a steady (DC) signal for a given value of mass flow, whereas the spinning mass flowmeter will have a sinusoidal varying output (AC) signal whose amplitude (and likewise, the area under the output signal curve) is directly proportional to true mass flow and whose frequency is directly proportional to the revolutions per second of the spinning sensors composed of disks 28 and 30.

The target type flowmeter can be thought of as an orifice turned inside out. In reference to FIG. 9, the sensing element is a solid circular disk (target) 42 mounted perpendicularly to the flow ($V_1$) and suspended at the level of the conduit axis by a system that measures the impact force (Fi) on the disk 42. This type of sensor can be used where an orifice type flowmeter was used in the prior art but with improved rangeability and less susceptibility to fluid borne particulates and entrained gas bubbles. Other types of sensors that could be used in this invention could be a pitot tube, averaging pitot tube, elbow venturi and flow nozzle.

Referring to FIG. 9, the equation for the impact force on a target disk 42 mounted in a fluid flow chamber 44 of a conduit 46 is:

$$Fi = Cd \cdot A \cdot \rho \sqrt{\frac{V_1^2}{2}} \qquad (1)$$

Where: Fi=the impact force on the target; Cd=the drag coefficient of the target; A =the area of the target; $\rho$=the fluid density; and $V_1$=the fluid velocity.

Solving (1) for $V_1$:

$$V_1 = \sqrt{\frac{2 \cdot Fi}{Cd \cdot A \cdot \rho}} \qquad (2)$$

Referring to FIG. 10, four orifice type (prior art) flow sensors (a,b,c and d) can be arranged as a hydraulic bridge type true mass flowmeter. As shown in FIG. 10, the four sensors are subjected to the main flow $V_1$ in conjunction with a recirculating pump flow by pump 52. With $V_2$ greater than $V_1$, the flow across sensors "b" and "d" will be $$\frac{V_2 + V_1}{2}$$

and the flow across sensors "a" and "c" will be $$\frac{V_2 - V_1}{2}.$$

This meter is called a Type 2 meter operation.

It is also possible to have $V_1$ greater than $V_2$ (see FIG. 11). The flow across sensors "b" and "d" would then be $$\frac{V_1 + V_2}{2}$$

and the flow across sensors "a" and "c" would be $$\frac{V_1 - V_2}{2}.$$

This is called a Type 1 meter operation.

To develop the equations for a Type 2 hydraulic Wheatstone bridge true mass flowmeter using target type sensors as described in FIG. 9 is as follows. The same can be done for the Type 1 type hydraulic bridge true mass flowmeter with equally equivalent results.

Using equation (2) where main flow adds to recirculating flow which is sensed by target "b":

$$\frac{V_2 + V_1}{2} = \sqrt{\frac{2 \cdot F_b}{Cd_b \cdot A_b \cdot \rho}} \qquad (3)$$

where: $V_1$=the main fluid flow velocity; $V_2$=the recirculating flow velocity; $F_b$=the force on target "b"; $Cd_b$=the drag coefficient of target "b"; $A_b$=the area of target "b"; and $\rho$=the fluid density.

The flow versus force relationship at target "a" where main fluid flow subtracts from recirculating flow and again using equation (2):

$$\frac{V_2 - V_1}{2} = \sqrt{\frac{2 \cdot F_a}{Cd_a \cdot A_a \cdot \rho}} \qquad (4)$$

where: $V_1$=the main fluid flow velocity; $V_2$=the recirculating flow velocity; $F_a$=the force on target "a"; $Cd_a$=the drag coefficient of target "a"; $A_a$=the area of target "a"; and $\rho$=the fluid density. Squaring (3) and (4) produce respectively, $$\frac{V_2^2 + 2V_2V_1 + V_1^2}{4} = \frac{2 \cdot F_b}{Cd_b \cdot A_b \cdot \rho} \qquad (5)$$

and $$\frac{V_2^2 - 2V_2V_1 + V_1^2}{4} = \frac{2 \cdot F_a}{Cd_a \cdot A_a \cdot \rho} \qquad (6)$$

subtracting expression (6) from (5) and assuming $Cd_bA_b = Cd_aA_a$ constitutes a constant "m":

$$V_2 V_1 = \frac{2(F_b - F_a)}{m \cdot \rho} \quad (7)$$

and by rearranging and substituting terms:

$$F_b - F_a = \frac{m \cdot V_2 \cdot \rho \cdot V_1}{2} \quad (8)$$

or $$\Delta F_{b,a} = K \cdot m \quad (9)$$

Where:

$$\Delta F_{b,a} = F_b - F_a$$

constitutes measured differential sensor forces; and $$k = \frac{m \cdot V_2}{2}$$

constitutes a constant; and $$M = \rho \cdot V_1$$

constitutes mass flow rate. Thus, as shown in (9), it is possible to measure true mass flow rate as a linear function of the differential force across the bridged sensors where $V_2$ is greater than $V_1$. The same proves true for the Type 1 meter operation where $V_1$ is greater than $V_2$.

The selection of whether $V_2$ is greater or less than $V_1$ is dependent on the expected magnitude of $V_1$, desired rangeability and other factors. Usually for very low flows, the recirculating flow $V_2$ is made larger than the main flow $V_1$. When the main flow is high or never is expected to go below some relatively high minimum value, $V_2$ is made smaller than $V_1$.

It should be noted that four of any type of a pressure differential flow sensor (such as an orifice plate, venturi, flow nozzle, elbow meter, pitot tube, averaging pitot tube or target) can be arranged in a Wheatstone bridge supplied by a constant volume pump 52 with a differential pressure (or force) resulting that is a linear function of true mass flow rate.

The same effect can be achieved with only two sensors (instead of four) if the main flow is divided equally between the two sensors and a constant volume pump extracts a constant flow from one sensor and adds that same flow to the other sensor. The mathematical analysis of the two sensor (prior art) flowmeter is identical to the previous example. This arrangement is rarely used, however, partly because the output signal is only one-half the magnitude of the four sensor bridge flowmeter. This limits rangeability of the two sensor flowmeter as compared to the four sensor bridge flowmeter. It is also more difficult to balance the extraction and injection of the recirculating flow and the loss coefficient of the two sensor flowmeter than within the four sensor bridge flowmeter.

The primary fact to be learned from the foregoing examples of prior art differential pressure type mass flowmeters is that to achieve a true mass flow measurement, an arrangement of these sensors must be achieved that adds and subtracts the measured flow to a constant flow so that the difference between the signals from each sensor will result in a linear true mass flow measurement.

The mass flowmeters are divided into two classes, the first class being inferential mass flowmeters and true mass flowmeters. The term true mass flowmeters is used to describe a meter that indicates the mass flow rate of a fluid without the operator being aware of the physical properties of the fluid concerned. The term inferential mass flowmeter is applied to thermal meters or to other meters that indicate the mass flow rate of a fluid (usually a gas) provided that the nature of the fluid is constant and that its property is known. Therefore, such inferential flowmeters are not "true" mass flowmeters.

A true mass flow measurement is one that is a direct measurement of mass and independent of the properties and the state of the fluid. Any mechanism that combines the use of force and acceleration to measure mass may be considered a true mass flowmeter. Prior to the present invention it is believed to have not been known to use the target type of flowmeter as a true mass flowmeter.

The spinning sensor meter of this invention can readily be implemented as an insertion probe type meter. In referring to FIG. 1, the insertion type meter would comprise the motor 20, the shaft 18 on which are mounted the arms 24 and 26 and the disks 28 and 30. The conductor 34 would be connected to a rate of flow indicator 36. The disks 28 and 30 would be inserted within a flow passage 14 of a conduit 10 and after a reading has been taken, the flowmeter would be separated from the conduit 10. The significance is the ability to measure the mass flow rate at a point in the conduit so flow in large conduits can be measured. No other true mass flowmeter can be implemented as an insertion probe type meter.

The target sensors 28 and 30 must spin at a circumferential velocity greater than the maximum main flow for the TYPE 2 meter operation which is depicted generally within FIG. 10. It is possible to put multiple disks 28 and 30 on the same shaft 18 which are spaced across the flow stream permitting averaging of the mass flow readings across the diameter of the conduit 10 especially if the conduit 10 is a large pipe.

Figure 2:
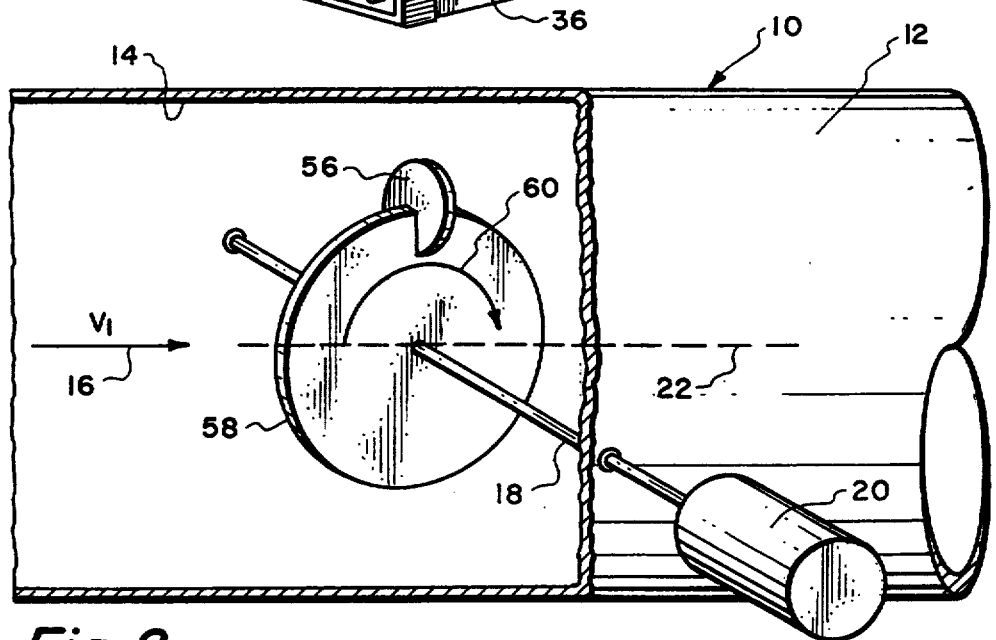
FIG. 2 is a generalized drawing, partly cut away, of the second embodiment of a moving sensor type of flowmeter of the present invention.

The spinning sensor meter is suitable for low cost applications requiring an electronic monitoring because it is possible to sense the changing forces on the target disks 28 and 30 without expensive sensors. One way to implement low cost application of the meter of this invention is to sense the current or power required by the motor 20 driving a single sensor type meter which is shown in FIG. 2. In the low cost implementation shown in FIG. 2, the single sensor, in the form of a target disk 56, is balanced by counterweights (not shown) located on the opposite side of a frame 58 which comprises an enlarged disc. The frame 58 is fixedly mounted on the shaft 18. The frame 58 is rotated in the direction of arrow 60. The balancing by counterweights of the target 56 is so that the frame 58 will spin smoothly without vibration in the absence of flow. The motor 20 could be an AC or DC constant speed motor but the following discussion will be in relation to a DC motor.

In a DC motor the armature current is directly proportional to torque which is related to the force required to move the target 56 through the fluid. Therefore, if the motor speed is held constant by a suitable control system and the armature current is measured in the presence of flow past the spinning target 56, the current will vary sinusoidally throughout one revolution of the motor 20. The amount of current variation will be directly related to the amount of torque variation which is directly related to the amount of main fluid flow represented by arrow 16. The AC component of the motor current can therefore be processed as described previously to yield an electrical signal proportional to mass flow. The DC component (or average) of motor current is due to varying friction, motor windage, and viscous drag, but because these parameters are relatively constant or change very slowly, such do not affect the AC component of motor current which is the only component processed to yield mass flow as previously described.

Measuring motor armature current to derive mass flow is not the most accurate method of measuring the force on the target 56, but it is applicable if cost is a primary concern over absolute accuracy. The primary components of inaccuracy in this technique are the temperature coefficient of motor armature current versus torque (which is primarily determined by the temperature coefficient of copper wire) and changes in the motor armature current versus torque over wide ranges of current (or torque).

An improvement in accuracy can be had by measuring the motor shaft torque or reaction torque. Since speed is not changing, shaft torque and reaction torque are equal. This increases the cost since a torque transducer is now required, but it removes the primary inaccuracies of the low cost current measurement technique. Therefore, measuring motor shaft torque or reaction torque represents an interim solution for high accuracy but still potentially a much less expensive true mass flow measurement.

One limitation of the spinning sensor flowmeter of the present invention is that a complete revolution of the spinning disks 28 and 30, or the disk 56, must be made before a highly accurate value of mass flow can be drived. The prior art HWB meter produces a continuous flow measurement with essentially no lag where the spinning sensor meter of the present invention can have a lag of one revolution of the target disk or disks. Although this is not a problem for most flow measurement applications, certain highly dynamic flow measurement applications would not be suitable for implementation of the flowmeter of the present invention.

Where measurement of high dynamic flows is a requirement, as for example transient automotive fuel consumption measurements, the delay caused by the rotational latency can be overcome with another implementation of the spinning sensor type of meter of this invention such as is shown in FIGS. 4, 5 and 6 of the drawings. Within the conduit 62 there is located a basically circular chamber 64. The fluid is to flow through the conduit 62 in the direction represented by arrows 66. The flow of the fluid through the chamber 64 is within the direction of arrows 68 and 70. The middle section 72 is closed to passage of fluid but does have a wheel 74 rotationally mounted therein. The wheel 74 connects to a motor shaft 76 with this motor shaft 76 extending from a motor 78. The motor 78 may be fixedly mounted on the exterior wall surface of the middle section 72. Fixedly secured to the circumference of the wheel 74 are a plurality (four in number) of arms 80. Each arm is spaced 90° from its directly adjacent arms. Fixedly secured to each arm 80 is a target sensor in the form of a disk 82. These disks 82 are referenced individually in the drawing by a1, a2, b1, and b2. These disks 82 are all of the same size and generally are shown to be circular. However, any desirable configuration of the disk 82 could be used.

Mounted on each of the arms 80 is a pair of transducers 84 with these transducers being divided into a first pair R1 and R3 and a second pair R2 and R4. It is to be understood that the first pair (R1 and R3) is mounted on arm 80 of disks a1 and b1. The second pair (R2 and R4) is mounted on arm 80 of disks a2 and b2. Normally the transducers 84 will comprise a strain gauge. However, other configurations of transducers could be used. It is the purpose of the transducers 84 to measure the force being applied to each disk 82 as it is rotated 360° through the chamber 64.

Notice that within FIG. 5 that a1 and a2 are 180° apart and b1 and b2 are also 180° apart with b1 and b2 being spaced 90° from both a1 and a2. The fluid flow, as mentioned previously, within conduit 62 is split into two paths as it flows through enlarged circular chamber 64. The shape of the enlarged circular chamber 64 forces the fluid flow into contact with the sensors 82 which are moving by being rotated through the chamber 64. This has the effect of changing the wave shape of the flowmeter output from a sign wave to a more square wave (actually trapezoidal) signal. This signal is represented in FIG. 6. The majority of the output signal will be at a constant level proportional to the mass flow with the rapid transition in the signal as the sensors 82 pass the inlet and outlet ports to the chamber 64. This rapid transition is represented by sections 86 within FIG. 6.

The waveforms at the bottom of FIG. 6 show a solid line for the difference in force signal between sensors a1 and a2 and a dashed line for the difference in force signal between sensors b1 and b2. Note that we assume 0° is in the center of the inlet port to the chamber 64. Then as the disks 82 rotate clockwise, the differential force between a1 and a2 rapidly goes positive (proportional to the main fluid mass flow rate) soon after the a2 sensor passes the inlet port opening 88 and maintains a constant amplitude until shortly before the a2 sensor approaches the outlet port opening 90. The "a" signal then rapidly passes through zero amplitude as the a2 sensor passes the outlet port opening 90 and then goes negative (proportional to the main fluid mass flow rate) and maintains a constant negative amplitude until shortly before the a2 sensor approaches the inlet port opening 88 at which time the cycle repeats. The cycle for the "b" sensors (disks 82) is identical to the "a" sensors but shifted by 90° as is shown in FIG. 6 due to the physical orientation of the "b" sensors relative to the "a" sensors. The waveforms in FIG. 6 are produced from two separate Wheatstone bridges similar to FIG. 3. Each Wheatstone bridge will be comprised of a R1, R2, R3 and R4 series of transducers with these waveforms being 90° out of phase to each other.

If the angular position of the sensors in the form of the disks 82 is known, it is possible to automatically switch between any portion of the "a" or "b" waveforms and to invert or not invert the resulting signal. This technique is known as synchronous demodulation and the result is a continuous DC wave-form proportional to true mass flow rate. The synchronously demodulated waveform consists of the portions of the waveform shown as solid and cross hatch bars in FIG. 6 designated as "a+" joined to "b+" joined to inverted "a−" joined to inverted to "b−". Notice that synchronous demodulation ignores the portions of the "a" and "b" waveforms near the inlet and outlet ports and combines the stable portions while simultaneously rectifying the negative amplitudes. The result is a continuous DC output signal that represents instantaneous true mass flow rate without the rotational lags produced by the simpler moving sensor meter implementations previously described.

This implementation shown within FIGS. 4 to 6 is more expensive than the simpler implementations described previously due to having dual sensor pairs which must be matched and because the enlarged circular chamber 64 has been added to the sensors 82 to change the sensor waveforms from a sine wave to approximately a square wave. However, even this implementation of the moving sensor meter of this invention should be less expensive to manufacture than prior art similar types of meters because it is still much less expensive to electrically match the outputs of the sensor pairs than to physically match precision ground orifices as is previously done with prior art HWB meters.

One specialized problem in flow measurement with all types of flowmeters (mass flow or volumetric flow) is the problem of measuring differential flows. This problem is particularly acute in automotive fuel consumption measurement applications on fuel injected engines (gasoline and diesel) which have a fuel supply manifold usually called a fuel rail which is maintained at a control pressure with the return flow line to the fuel tank for excess fuel. Such fuel systems are currently the norm for both gasoline and diesel engines. To measure fuel consumed, it is required that the difference between the supply fuel and the return fuel mass flows be measured. Normally the supply fuel and the return fuel are at different pressures and at different flows. Also note that the return fuel is frequently aerated (especially with diesel engines) and at a different temperature (and therefore a different density) than the supply fuel. Eliminating the return flow so that the supply flow equals engine consumption is not generally an option since the return fuel flow is typically used to cool the fuel injectors. Several techniques have been applied to overcome this problem but all have had problems of various types.

The simplest method used has been to install two flowmeters, one in the supply fuel flow and another in the return fuel flow, and simply take the difference between the two signals. This technique obviously doubles the cost of measuring fuel consumption which is especially a problem for true mass flow measurement meters which typically cost $5,000 to $15,000 each. Another problem is that the accuracy of the measurement is halved since the errors for each meter must be added for the total system accuracy. For these reasons, the dual meter approach is rarely used for precision measurement applications.

What is needed is a differential mass flowmeter. As shown in FIG. 7, a differential true mass flowmeter would greatly simplify flow measurements and make in-vehicle true mass flow measurements practical because it does not modify the standard fuel supply system to the engine. The view of the flowmeter of FIG. 7 is basically similar to the view of FIG. 4 with there being two separate conduits 92 and 94 instead of the single conduit shown in FIG. 4. Conduit 92 could be the fuel line to the engine and conduit 94 could be the return fuel line. Conduit 92 is interrupted with a middle section 96 with a similar middle section 98 interrupting the conduit 94. Conduit 92 has an enlarged toroidal chamber 100 with conduit 94 having an enlarged toroidal chamber 102. Movably mounted within the chamber 100 is a pair of target sensors in the form of disks 104. One disk is referenced b1 and the second disk is referenced b2. The disks b1 and b2 are located 180° apart.

This disk b1 is fixedly mounted on an arm 106 with disk b2 being mounted on an arm 108. Arms 106 and 108 are fixedly mounted on a center wheel 109 which is centrally fixed to shaft 110. Shaft 110 is the rotating shaft of a motor 112 which is fixedly mounted on the exterior wall surface of the middle section 96. Mounted on the arm 108 is a transducer 114 which has been assigned reference R2. A similar strain gauge transducer is mounted on arm 106 and has been assigned reference R1. Flow through conduit 92 is in the direction of arrows 118. It is to be understood that the wheel 109 will have two other disks (not shown), which would be referenced a1 and a2. The longitudinal cross-sectional view of conduit 92 would resemble FIG. 5.

Flow through conduit 94 is in the direction of arrows 120. It is to be noted that the flow represented by arrows 120 is opposite to the flow direction represented by arrows 118. Typically the conduit 92 would be used to supply fuel to an engine with conduit 94 conducting return fuel back to the storage tank (not shown) from which the fuel is caused to flow into conduit 92. Fixedly mounted on the wheel 127 are arms 122 and 124 which are located 180° apart. There will be an additional two arms (not shown) to which a disk (a3 and a4) will be attached with a sensor connected to each arm. Again, the longitudinal cross-sectional view of conduit 94 would resemble FIG. 5. Fixedly mounted on the arm 122 is a strain gauge transducer 126. A similar strain gauge transducer 128 is fixedly mounted on the arm 124. The arm 122 is connected to a disk shaped target sensor 130 which is located within the chamber 102. This target sensor is referenced b3. A similar target sensor 130 is fixedly connected to the arm 124 and is referenced b4. There will be a strain gauge (not shown) attached to each arm that connect with the remaining two sensors a3 and a4 (not shown).

At first it may appear in FIG. 7 that there are two separate flowmeters because there are two separate toroidal flow chambers 100 and 102, but in fact all four "b" sensors 104 and 130 each have one strain gauge 114, 116, 126 and 128 and these strain gauges are connected together in a single Wheatstone bridge which is shown in FIG. 8. The Wheatstone bridge is a typical substractive circuit but by no means the only substractive circuit that could be used. The function that is being performed by the substractive circuit is (b1−b2)−(b2−b4). There is a separate Wheatstone bridge for the "a" sensors (not shown). In FIG. 8 the lines 132 and 134 are to be connected to the circuit within the rate of flow indicator 36. Strain gauge 114 is referenced in the Wheatstone bridge of FIG. 8 as R2. Strain gauge 116 is referenced as R1 in FIG. 8. The strain gauge 126 is referenced as R4 and the strain gauge 128 is referenced as R3 in the Wheatstone bridge shown in FIG. 8. The Wheatstone bridge of FIG. 8 is excited by an appropriate power source such as a battery 54.

with the flow direction shown in FIG. 7, the strain gauges R1 and R4 will have increasing resistance during the next 180° of rotation and strain gauges R2 and R3 will have decreasing resistance during the same portion of the cycle as shown by the arrows on the strain gauge Wheatstone bridge depicted in FIG. 8. Note that if the flow direction in the chamber 102 was reversed, the output of the rate of flow indicator 36 would behave exactly like the implementation shown in FIG. 4. In other words the arrows (and the forces) on strain gauges R3 and R4 would reverse.

Implemented as shown in FIG. 7, the moving sensor flowmeter of this invention can either add or subtract two separate flows depending on the direction of flows within the conduits 92 and 94. This implementation of the spinning sensor true mass flowmeter of the present invention is the most expensive yet described. However, this is the only flowmeter that has the unique capability of directly measuring differential mass flow rates with instantaneous response even with aerated fluids and in-vehicle applications.

FIGS. 10 and 11 are flow diagrams for a conventional Wheatstone bridge. $V_1$ is the velocity of the measured flow into the Wheatstone bridge. This measured flow is separated into two paths at an intersection 51. The two paths comprise a conduit 53 and a conduit 55. Conduit 53 has flow sensor a mounted therein. Conduit 55 has a flow sensor d mounted therein. Conduit 53 feeds into conduit 57 at an intersection 59. Conduit 55 feeds into conduit 61 at an intersection 63. The inlet side of the recirculating pump 52 extracts a recirculating flow at velocity $V_2$ from intersection 63 and discharges such at intersection 59. Conduit 57 includes flow sensor b with conduit 61 having flow sensor c. Conduits 61 and 57 connect together at intersection 65 which again combine to produce the measured flow $V_1$ within outlet conduit 67.

What is claimed is:

1. A linear true mass flowmeter for a conduit with a liquid moving longitudinally along a path within the conduit at a first velocity, said conduit having a wall, said linear true mass flowmeter comprising:

a frame located within said conduit in said path of said liquid with said liquid to flow around said frame, said frame being mounted on a shaft, said shaft being pivotally mounted on said wall about an axis, said axis being transverse to the path of said liquid, said shaft being longitudinally and radially fixed in position on said wall;

means for pivoting said shaft;

at least one sensor mounted on said frame, said sensor being of a differential pressure type, during pivoting of said shaft said sensor is moved at a second velocity, during a single cycle of said movement said sensor senses flow of said liquid at an additive velocity comprised of said first velocity plus said second velocity and at a subtractive velocity comprised of the difference between said first and second velocities;

at least one transducer being connected to said sensor, said transducer to detect said additive velocity and said subtractive velocity;

a rate of flow indicator connected to said transducer for receiving the detected said additive velocity and said subtractive velocity, said rate of flow indicator to display the value of the rate of flow of said liquid moving within said conduit determined from said additive velocity and said subtractive velocity; and there being two in number of said conduits with each said conduit having a separate flow path, the direction of movement of the fluid within said separate flow paths being in opposite directions, there being a separate frame mounted within each said conduit, both said frames being fixedly mounted on said shaft and rotatable thereby, a plurality of sensors mounted on each said frame with there being a single transducer connected to each said sensor, the outputs of said transducers being connected through a subtractive circuit.

* * * * *